UNITED STATES PATENT OFFICE.

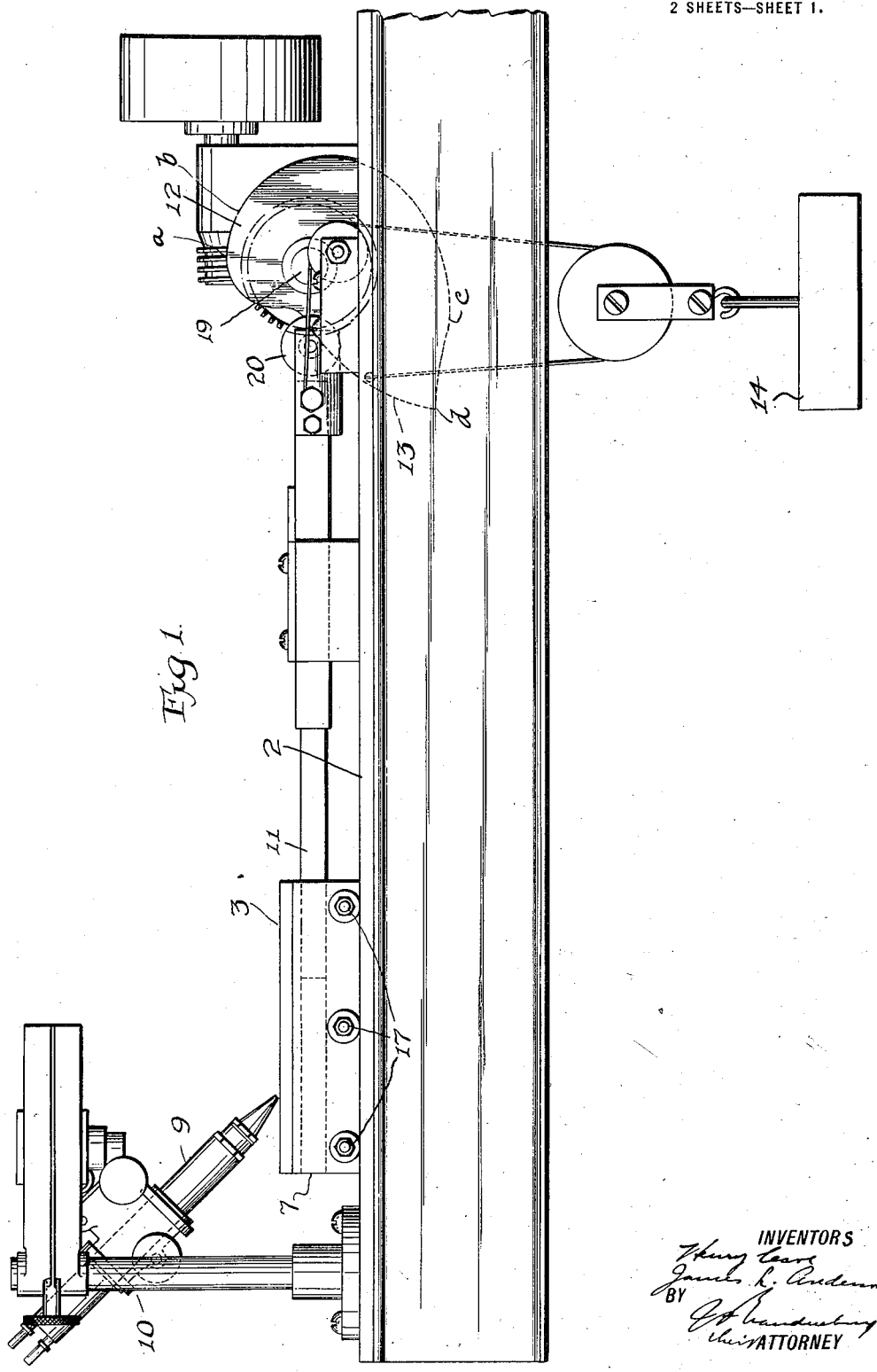

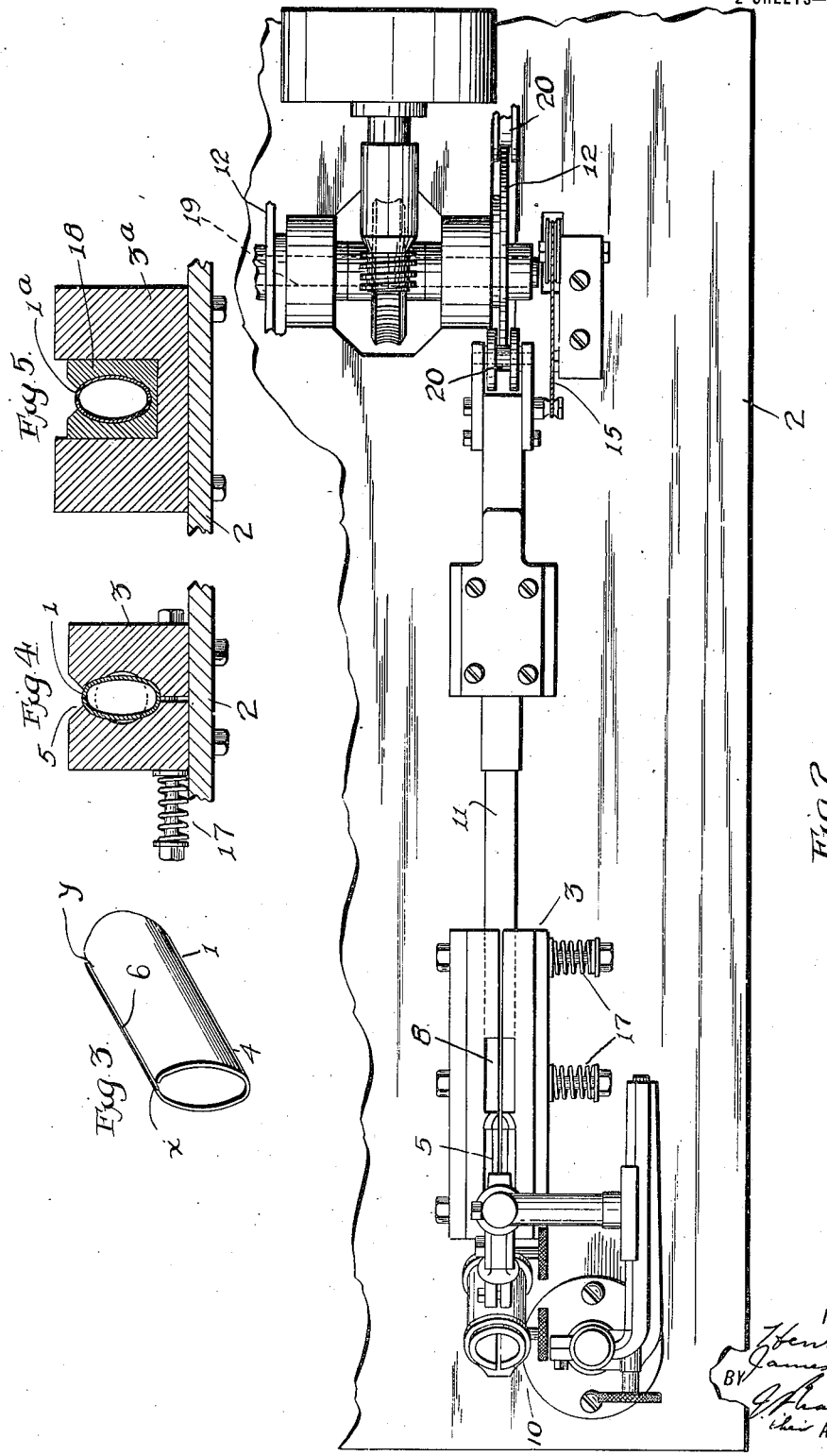

HENRY CAVE, OF HARTFORD, CONNECTICUT, AND JAMES L. ANDERSON, OF BAYONNE, NEW JERSEY, ASSIGNORS TO DAVIS-BOURNONVILLE COMPANY, OF NEW YORK, N. Y., A CORPORATION OF NEW YORK.

AUTOGENOUS-FLAME-WELDING MACHINE.

1,341,840.              Specification of Letters Patent.         Patented June 1, 1920.

Application filed November 28, 1917, Serial No. 204,343. Renewed April 9, 1920. Serial No. 372,704.

*To all whom it may concern:*

Be it known that we, HENRY CAVE and JAMES L. ANDERSON, citizens of the United States, and residents, respectively, of Hartford, in the county of Hartford and State of Connecticut, and of Bayonne, in the county of Hudson and State of New Jersey, have invented new and useful Autogenous-Flame-Welding Machines, of which the following is a specification.

The invention relates to machines for butt-welding juxtaposed edges by the autogenous flame process, and is particularly concerned with the welding of short thin-walled hollow bodies. Heretofore it has not been practicable to weld short lengths by machine because the initial part of the seam, not being preheated by conduction, is united poorly, if at all, while the terminal portion, having no metal beyond it to receive its heat, is overheated and burned. In welding long tubes the faulty ends can be cut off and treated as scrap, but this is not permissible with short pieces or such as are blanked to the final dimensions of the article to be produced. To overcome this difficulty we have devised a machine wherein the speed of relative travel between the work and the welding flame is varied automatically during the execution of the weld, depending upon the conductive conditions at different regions, and more especially to compensate for the unbalanced conditions obtaining toward the beginning and conclusion of the weld. To this end means are provided for advancing the work, or conversely the torch, relatively slowly at the initial end of the weld and relatively fast at the terminal end, while in between the speed may be varied practically throughout in order to secure still more complete adjustment of the heating to the requirements of each portion of the weld. This it will be seen is in direct opposition to ordinary practice, wherein the aim has been to effect a uniform displacement of the torch, or of the work, as the case may be. Preferably the articles to be welded are fed relatively to a stationarily supported torch, and the invention also comprises a simple and advantageous mechanism for receiving, holding, guiding and advancing the short hollow or tubular bodies beneath the flame.

In the accompanying drawing illustrating the invention:

Figure 1 is a side elevation of the apparatus;

Fig. 2 is a plan view thereof;

Fig. 3 is a perspective view of a blank;

Fig. 4 is a cross-section through the jig with the blank therein; and

Fig. 5 is a cross-section of another form of blank-holding means.

The bayonet scabbard ferrule blank 1 of Fig. 3 if machine welded in the ordinary way would show a lack of union at $x$ and be burned at $y$, assuming the welding to proceed from the end $x$ to the end $y$. Since this would render the product useless, it would be necessary to do the work by hand, at much greater expense and far more slowly. The present invention makes machine welding possible and effective for work of this character. It will be understood, of course, that the invention is not limited in its application to these precise articles, and that the mechanism may be adapted for the welding of any desired shapes or pieces.

Upon a table 2 is fixed a jig or guiding work-holder 3 having a longitudinal passage in its interior wherein the blanks are held and guided. The top of the jig has a longitudinal top opening 5 to expose the unwelded seam 6 to the action of the welding flame, and one end 7 is also open, to permit the discharge of the welded article. The blanks are admitted through a top entrance 8 to a receiving position in the jig, from which they are advanced successively to the welding position.

The welding is effected by the flame delivered by an ordinary oxyacetylene or equivalent welding torch 9, which is supported over the jig by a torch-holder 10, which permits various adjustments of the position of the torch not necessary to be here described. As is well understood in this type of welding the union is effected by the flame actually melting the edges together, the product being in effect a cast butt-joint.

The means for variably displacing the blank beneath the welding flame comprises a reciprocatory rod 11 actuated by a cam 12, the forward end of the rod passing through the rear end of the jig to act as a pusher. The particular outline of the cam must, of course, be designed for the particular work to be done, but in general it will have a region, here marked a—b, adapted to cause the blank, or the torch, to travel at a relatively slow but increasing velocity during the initial portion of the weld, and another region c—d for causing the movement to speed up toward the end. In between, the curvature of the cam may be substantially circular, corresponding to uniform speed, or it may depart from circularity to an extent and in a manner to produce any desired variation in the speed throughout the intermediate region of the weld, all to the end of securing a uniform weld throughout the seam.

The drop 13 on the cam permits the pusher to be retracted quickly at the end of the forward movement by a weight 14 attached to a cord 16, thus clearing the entrance 8 for the admission of a fresh blank. A blank is then inserted, being in this position beyond the range of the welding jet. The rod then moves forward, causing the seam to travel beneath the flame in the manner just described, and finally pushing the welded blank clear of the flame. Upon the pusher now retreating, a fresh blank is placed in the jig, and the operation is repeated. In the particular construction illustrated each blank after being welded is left in the embrace of the forward part of the jig, and is expelled by the next blank, but obviously with a longer stroke of the pusher each blank can be welded and expelled in the same movement.

The jig shown in Figs. 1, 2 and 4 is a block made in halves, one of which is mounted so as to be capable of limited lateral movement with respect to the other, toward which it is pressed by spring-bearing bolts 17, to bring the edges of the seam together. In the construction of Fig. 5, the blank 1ª is compressed by pressing it into the appropriately shaped socket of a carrier block 18, which is placed in a rigid jig 3ª to be advanced by the pusher. The latter construction is particularly suitable for tapered articles.

To increase the capacity of the machine two or more cams 12 may be mounted on the same shaft 19, and each cam may cooperate with the anti-friction devices 20 of two pushers, as indicated in Fig. 2.

What we claim as new is:

1. In a machine for welding by the autogenous flame process, the combination of a work-holder, means for delivering a welding flame of the character indicated upon the edges to be united, and mechanism for producing relative feed travel between the flame and work at a rate varying during the execution of the weld, for the purpose set forth.

2. A machine for welding short hollow bodies by the autogenous flame process comprising the combination of a work-holder, a torch-support, and mechanism for producing relative travel between the work and torch-support at a varying rate of speed, the travel being relatively slow at the beginning of the weld and relatively rapid at the conclusion.

3. In a machine for welding by the autogenous flame process, the combination of a work-holder, a torch-support, and a cam cooperative with one of the foregoing to produce relative feed travel between the work and torch, said cam being designed to vary automatically the speed of the weld.

4. In a machine for welding short tubular lengths, the combination with a stationarily supported welding torch of a stationary jig having a passage and an exit for the said articles, and a reciprocatory pusher operating toward and from the exit to feed the blank beneath the flame from the rear and through the exit.

5. In a machine for welding short tubular lengths, the combination with a stationary jig having a horizontal passage for the said articles leading to an exit, a top entrance, and a top opening for the flame, and means for pushing the articles through the passage beneath the flame and out of the exit.

6. In a machine for welding short tubular lengths, the combination with a stationarily support welding torch, a stationarily supported welding torch, of a relatively stationary work-holder having a passage for the said articles, and a pusher acting behind the rear ends of the articles to advance them through the work-holder in operative relation to the flame.

7. In a machine for welding short tubular lengths, the combination with a stationarily supported welding torch, of a stationary jig comprising a block made in halves with a passage therein for the said articles and means for pressing the halves toward each other, and means for advancing the articles through the embrace of the passage in operative relation to the flame.

8. The method of butt-welding seams, which comprises fusing the edges by an autogenous welding flame while producing continuous relative travel between the work and flame lengthwise of the seam, and compensating for inequalities of heating by varying the speed of longitudinal displacement.

HENRY CAVE.
JAMES L. ANDERSON